Aug. 10, 1948.   T. J. KEARY   2,446,835
COMPRESSION-WAVE DELAY DEVICE
Filed June 21, 1946
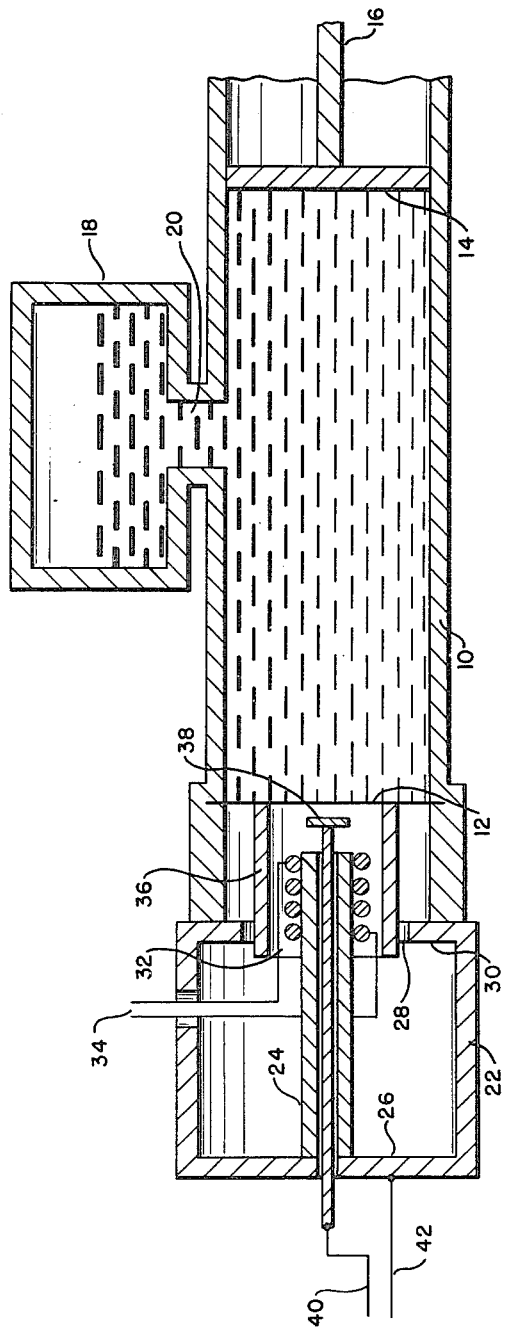
INVENTOR
THOMAS J. KEARY
BY
*William D. Hall,*
ATTORNEY Patented Aug. 10, 1948

2,446,835

UNITED STATES PATENT OFFICE 2,446,835

COMPRESSION-WAVE DELAY DEVICE

Thomas J. Keary, San Diego, Calif., assignor, by mesne assignments, to United States of America as represented by the Secretary of War Application June 21, 1946, Serial No. 678,172

6 Claims. (Cl. 178—44)

This invention relates to electrical apparatus and more particularly to means for delaying an electrical signal by a variable amount.

In many instances in the electronic art it is necessary to delay an electrical signal, for instance video-frequency pulses, by a few microseconds or a few milliseconds. This may be done, for example, in radio object locating systems to cause selected signals in one channel to correspond in time with selected signals in another channel. A second exemplary use for a video delay is to measure the time of occurrence of one signal as compared to the time of occurrence of another signal. Other uses for such means for delaying a video signal will be immediately obvious to those familiar with the electronic art.

Delay lines heretofore employed to delay video signals have been of electronic type, but their disadvantage is that the voltage-time shape of the video signals is distorted in passing through such a delay line. A second disadvantage of electronic delay lines is that the maximum time delay is relatively short and is not usually variable over a wide range.

It is an object of the present invention, therefore, to provide a delay means that will delay video signals by a selected amount, this amount being easily variable without seriously changing the voltage-time wave shape of the signal.

It is a further object of this invention to provide a supersonic delay line in which the time delay may be adjusted over a relatively wide range.

For a better understanding of the invention together with other and further objects thereof, reference is had to the drawing in which the sole figure is a schematic drawing of what is at present the preferred embodiment of the invention.

In Fig. 1, a hollow pipe member 10 is closed at one end by a thin diaphragm 12 and at the other end by a movable plunger 14. The position of plunger 14 is controlled by an operating handle 16. A reservoir 18 communicates with the interior of pipe member 10 through an opening 20. A liquid transmission medium which may be mercury or other suitable liquid completely fills pipe member 10 and partially fills reservoir 18. The level of the liquid in reservoir 18 will depend upon the position of plunger 14. When plunger 14 is at its closest position relative to diaphragm 12 the liquid in reservoir 18 may nearly fill reservoir 18, while when plunger 14 is at its greatest distance from diaphragm 12, reservoir 18 may be almost empty. A cylindrical member 22 is mounted upon pipe member 10 so that the axes of members 10 and 22 are colinear. A center post 24 extends from the outer end 26 of member 22 along its colinear axis and through an opening 28 in its other end 30. A gap thus exists between the cylindrical surface of center post 24 and the colinear cylindrical surface defining the opening 28. A coil 32 is wound or mounted on center post 24 and is provided with electrical connections 34 to receive an electrical signal. Mounted upon diaphragm 12, and extending through the gap and over coil 32 is a hollow cylindrical armature 36. A plate 38 located near but not touching diaphragm 12 serves as an electrical pick-up means for signals impinging on diaphragm 12. An insulated electrical lead 40 connected to plate 38 extends through center post 24 and end wall 26 of member 22. An electrical connection 42 to the member 22 provides the other lead for the electrical pick-up means. Member 22, armature 36 and center post 24 should be of some suitable magnetic material. Cylindrical member 22 should be of some conductive material or an electrical connection should be made from diaphragm 12 to connection 42.

The apparatus shown in Fig. 1 operates as follows: The video-frequency pulses to be delayed are first applied to a modulator circuit (not shown) so that these video signals amplitude-modulate a second signal having a more suitable frequency that may, for example, be in the high audio range. This modulated signal is applied through connections 34 to coil 32. This video-modulated signal causes a magnetic field to be set up within coil 32 and in the annular gap between center post 24 and member 22, and causes diaphragm 12 to oscillate or vibrate at the carrier frequency of the signal applied at connection 34. The amplitude and time duration of these oscillations will be determined by the amplitude and time duration of the applied video signals. The oscillation of diaphragm 12 causes compressional waves to travel through the liquid enclosed within pipe member 10. These energy waves strike plunger 14 and are reflected so that they impinge upon diaphragm 12, setting this diaphragm in motion. In general the time duration of the signals applied to coil 32 will be very much less than the time required for the signal to travel from diaphragm 12 to plunger 14 and return. The oscillation of diaphragm 12 due to the signal applied to coil 32 will therefore have stopped before the echo signal again causes diaphragm 12 to oscillate. The motion of diaphragm 12 with respect to plate 38 varies the capacitance between these two elements. Diaphragm 12 and plate 38 therefore function as the plates of a condenser microphone. Connections 40 and 42 provide means for connecting plate 38 and diaphragm 12 into a conventional condenser microphone amplifier circuit. This amplifier circuit (not shown) will receive and demodulate a signal impinging upon diaphragm 12, and supply as an output signal a signal corresponding in voltage-time shape to the original video signal. The time delay of a signal in passing through this delay apparatus, that is, the time between the instant at which a signal is applied at lead 34 and the instant at which a signal appears at leads 40 and 42, is a function of the speed of transmission of compressional energy in the liquid transmission medium and of the length of the transmission path from diaphragm 12 to plunger 14. The delay encountered by signals passing through this delay apparatus may be varied by adjusting the position of plunger 14, as by means of operating handle 16. If desired, the position of operating handle 16 may be controlled by a suitable screw mechanism so that plunger 14 may be moved by very small increments.

An advantage of this apparatus is that the time delay of signals passing therethrough is easily variable. Further, the apparatus is comparatively simple, and the wave shape of signals passing therethrough is not greatly distorted.

Other means, for example, vibrating crystals, may be employed to set up the compressional waves in the transmission medium, and similarly, other means than that here shown may be employed to receive energy from the transmission medium. In other embodiments of the invention it may be desirable to locate the transmitting device at one end of the transmitting medium and the receiving device at the other end of the transmitting medium.

Other changes and modifications will be apparent to those skilled in the art, and it is therefore not intended that the invention be limited to the particular apparatus herein shown, rather it is intended that it include all equivalent apparatus that falls within the scope and spirit of the appended claims.

The invention claimed is:

1. A signal delay apparatus comprising a coil adapted to receive an input signal, a metallic diaphragm magnetically associated with said coil, a liquid transmitting medium and enclosing means therefor associated with said diaphragm so that oscillations of said diaphragm cause compressional energy signals to travel through said liquid medium, reflector means adapted to reflect said energy signals back toward said diaphragm as an echo signal delayed by a predetermined amount relative to said input signal, and a metallic plate capacitively associated with said diaphragm to serve as an electrical pick-up means for said echo signal.

2. Apparatus in accordance with claim 1 wherein said enclosing means comprises a hollow pipe member closed at one end by said diaphragm and at the other end by said reflector means, and a liquid storage means communicating with said hollow pipe member.

3. Apparatus in accordance with claim 1 wherein said reflector is adjustable in position to alter the time delay between said input signals and said echo signals.

4. A signal delay apparatus comprising a liquid compressional wave transmitting medium, enclosing means therefor, liquid level maintaining means communicating with said enclosing means, an adjustable plunger for reflecting compressional waves in one end of said enclosing means, a metallic diaphragm in the other end of said enclosing means having one side operatively associated with said liquid compressional wave transmitting medium, a coil wound on a metallic core and adapted to receive an input signal, a metallic hollow cylinder concentrically surrounding said coil, said coil being disposed nearer to one base of said metallic cylinder, the other side of said metallic diaphragm covering the other base of the said metallic cylinder and being attached thereto, a fixed capacitor plate spaced close to said other side of the said metallic diaphragm and forming a capacitor therewith whereby axial variations in said metallic diaphragm position will cause variations in the capacity of said capacitor, and means to detect said capacitor variations.

5. A compressional wave transducer comprising a coil wound on a magnetic core and adapted to receive an input signal, a hollow magnetic cylinder concentrically surrounding said coil, and a metallic diaphragm attached to said cylinder.

6. A transducer as set forth in claim 5, comprising a metallic plate positioned close to said metallic diaphragm to form a capacitor therewith, whereby varying axial displacements of said metallic diaphragm will cause corresponding variations in said capacitor value.

THOMAS J. KEARY.

REFERENCES CITED

The following references are of record in the file of this patent:

FOREIGN PATENTS

| Number | Country | Date |
| --- | --- | --- |
| 227,788 | Great Britain | Jan. 1, 1926 |

OTHER REFERENCES

"Ultrasonic Measurements of the Compressibility of Solutions and of Solid Particles in Suspension," by Chester R. Randall; Bureau of Standards Journal of Research; vol. 8, pp. 79–83 and 89–96; January 1932. (Copy in Patent Office Library.)